US012721417B2

(12) United States Patent
Leier

(10) Patent No.: US 12,721,417 B2
(45) Date of Patent: Sep. 1, 2026

(54) SHAVING RAZOR CLEANING DEVICE

(71) Applicant: Kade Peter Leier, Fargo, ND (US)

(72) Inventor: Kade Peter Leier, Fargo, ND (US)

( * ) Notice: Subject to any disclaimer, the term of this patent is extended or adjusted under 35 U.S.C. 154(b) by 450 days.

(21) Appl. No.: 18/489,424

(22) Filed: Oct. 18, 2023

(65) Prior Publication Data

US 2024/0130507 A1 Apr. 25, 2024
US 2024/0225235 A9 Jul. 11, 2024

Related U.S. Application Data

(60) Provisional application No. 63/417,380, filed on Oct. 19, 2022.

(51) Int. Cl.
*A45D 27/46* (2006.01)
*B08B 3/02* (2006.01)

(52) U.S. Cl.
CPC ................ *A45D 27/46* (2013.01); *B08B 3/02* (2013.01)

(58) Field of Classification Search
CPC ....................................................... A45D 27/46
See application file for complete search history.

(56) References Cited

U.S. PATENT DOCUMENTS 4,480,387 A 11/1984 d'Alayer de Costemore d'Arc
4,838,949 A 6/1989 Dugrot
4,941,492 A 7/1990 Morgan
D380,067 S 6/1997 Brenneman
D433,187 S 10/2000 Dettman
10,631,613 B1 4/2020 Totonelly
2020/0114319 A1* 4/2020 Galbreath-O'Leary ..................... B01F 23/23123

FOREIGN PATENT DOCUMENTS

DE 102017102490 A1 8/2018
WO WO-9422600 A1 10/1994
WO WO-2019161442 A1 8/2019
WO WO-2019233639 A1 12/2019

* cited by examiner

*Primary Examiner* — Spencer E. Bell
(74) *Attorney, Agent, or Firm* — Schwegman Lundberg & Woessner, P.A.

(57) ABSTRACT

A razor cleaning device can include an aerator housing securable to a faucet. The aerator housing can include a pair of slots. A razor cleaning device can include a razor housing configured to receive a razor therein. The razor housing can include a bottom portion defining an opening to receive a head of the razor into the razor housing. The razor housing can include a top portion defining a jet configured to discharge water from the faucet toward the head of the razor when the razor is inserted into the housing. The razor housing can include pair of bosses releasably insertable into the pair of slots of the aerator housing, respectively, to releasably secure the razor housing to the aerator housing and the faucet.

20 Claims, 15 Drawing Sheets

SHAVING RAZOR CLEANING DEVICE

CLAIM OF PRIORITY

This patent application claims the benefit of priority, under 35 U.S.C. Section 119(e), to U.S. patent application Ser. No. 63/417,380, entitled "SHAVING RAZOR CLEANING DEVICE," filed on Oct. 19, 2022, which is hereby incorporated by reference herein in its entirety.

BACKGROUND

This application relates to cleaning devices and more specifically to cleaning devices for shaving razors.

Shaving razors come in various shapes and sizes. For example, shaving razor designs vary between the number of blades included. Modern razor heads for shaving human body parts often include several parallel blades such as two to five blades, for providing a close shave with limited shaving passes.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Modern disposable razor heads often include two to five blades positioned in parallel and tightly spaced. Because the blades are tightly spaced, hair and other shaving debris can become trapped between the blades, reducing the shaving effectiveness of the razor and reducing a life span of the shaving head. Such debris can be difficult to remove from the relatively tight spaces between the several blades.

The devices and systems of this application can help to address these issues by providing a razor cleaning device that is securable to a faucet. The device can receive the razor head therein and can provide a jet or stream of water from the faucet to the razor head. The device can be configured (e.g., sized and shaped) to allow a user to move the razor within the device to effectively remove debris and hair trapped between blades (or generally from the razor head), helping to improve shaving effectiveness of the razor and helping to increase a life of the razor. The device can also be releasably securable to the faucet to allow a user to use the faucet normally when not using the device.

The above discussion is intended to provide an overview of subject matter of the present patent application. It is not intended to provide an exclusive or exhaustive explanation of the invention. The description below is included to provide further information about the present patent application.

Figure 1:
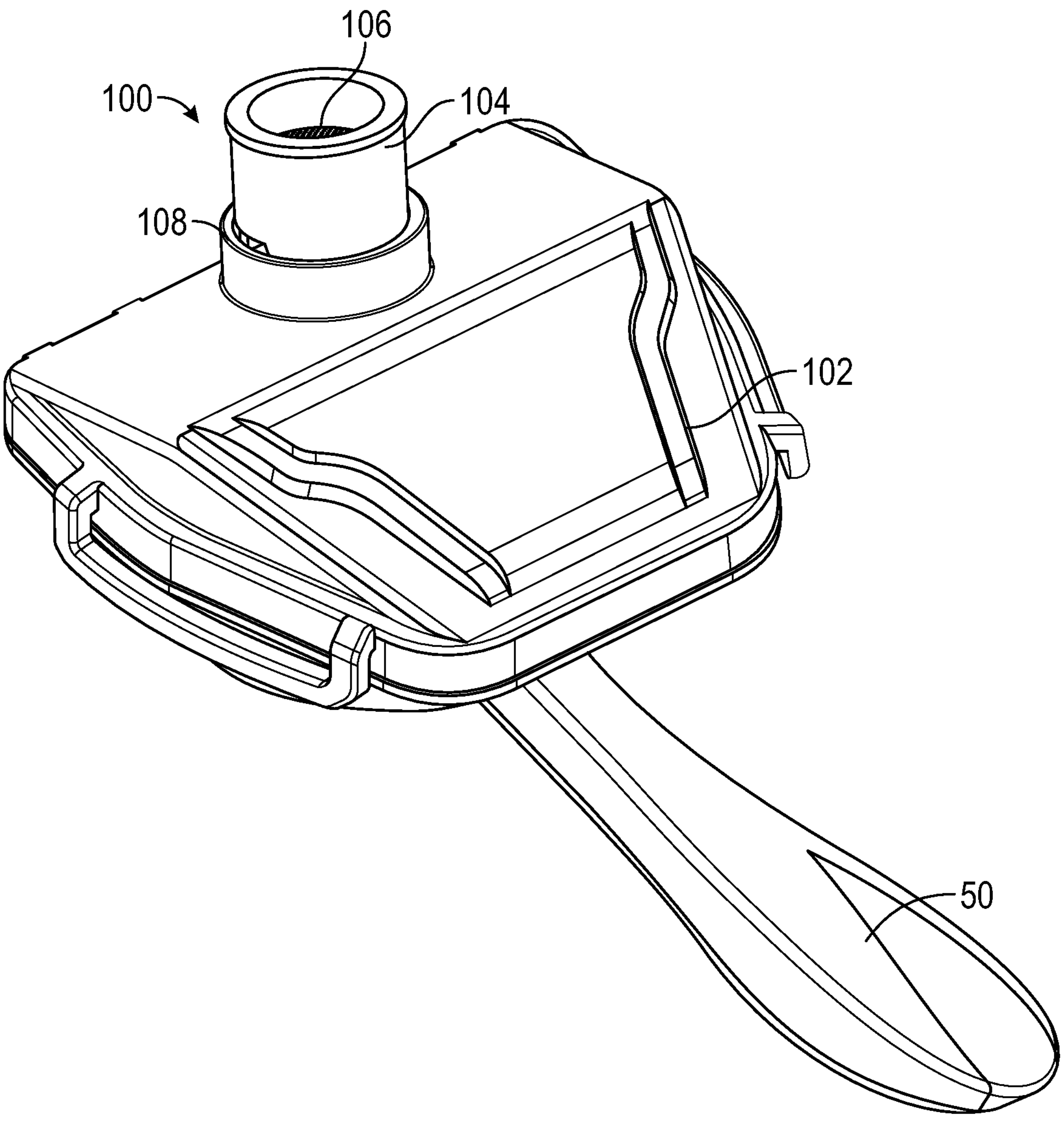
FIG. 1 illustrates a top isometric view of a razor cleaning system.

FIG. 1 illustrates a top isometric view of a razor cleaning system 100, which can include a housing 102 and an aerator assembly including an aerator housing 104 and an aerator 106. The housing 102 can include or can define a collar 108 for receiving the aerator housing 104 therein to secure the aerator housing 104 to the housing 102. FIG. 1 also shows a razor 50, which can be insertable into the housing 102, as discussed in further detail below.

Figure 2:
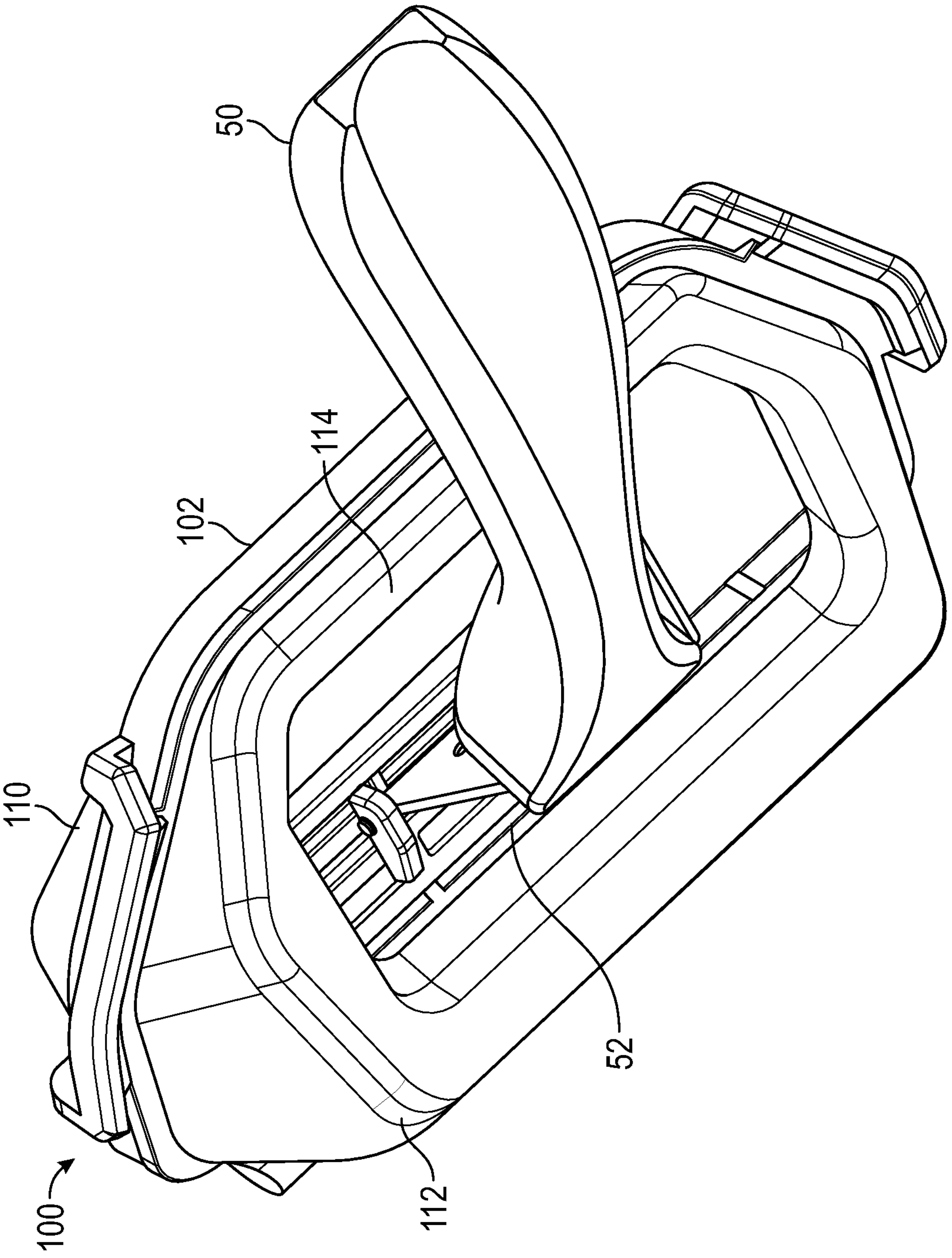
FIG. 2 illustrates a bottom isometric view of a razor cleaning system.

FIG. 2 illustrates a bottom isometric view of the razor cleaning system 100. The razor cleaning system 100 can be consistent with the razor cleaning system 100 of FIG. 1; FIG. 2 shows additional details of the razor cleaning system 100. For example, FIG. 2 shows that the housing 102 can include an upper portion 110 and a lower portion 112 that can together form a clamshell that is releasably secured, as discussed in further detail below. FIG. 2 also shows that the lower portion 112 can define an opening 114 therein or therethrough. The opening 114 can be configured (e.g., sized or shaped) to receive a head 52 of the razor 50 into the housing 102 such as for cleaning of the head 52.

Figure 3:
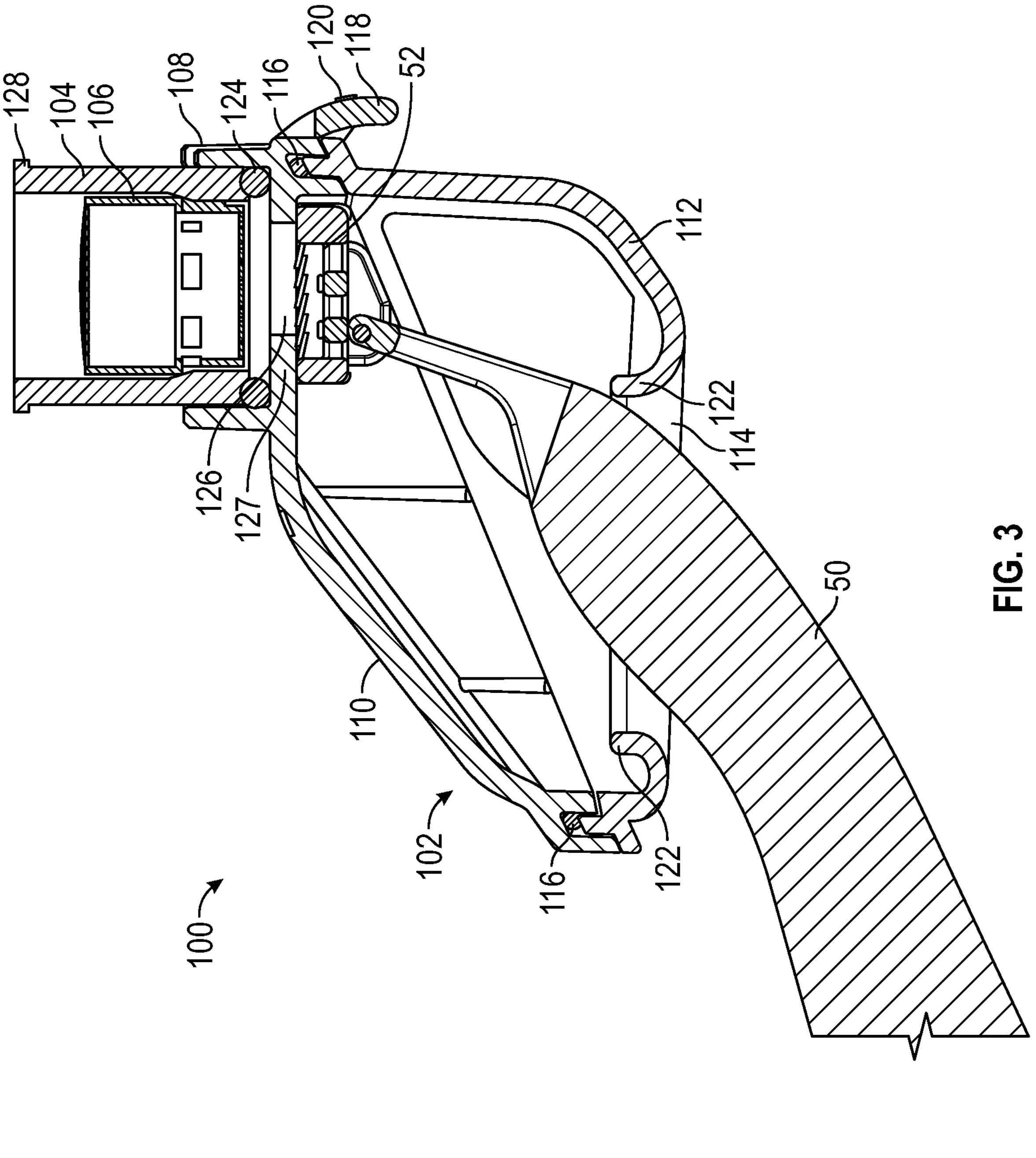
FIG. 3 illustrates a side cross-sectional view of a razor cleaning system.

FIG. 3 illustrates a side cross-sectional view of the razor cleaning system 100. The razor cleaning system 100 of FIG. 3 can be consistent with the razor cleaning system 100 of FIGS. 1-2; FIG. 3 shows further details of the razor cleaning system 100.

For example, FIG. 3 shows that the razor cleaning system 100 can include a gasket 116 between the upper portion 110 and the lower portion 112, which can extend around a full perimeter between the upper portion 110 and the lower portion 112 or can extend around a portion of the perimeter or periphery of the upper portion 110 and the lower portion 112. The gasket 116 can be compressible between the upper portion 110 and the lower portion 112 to form a seal therebetween.

FIG. 3 also shows that the upper portion 110 can include a hook 118 and the lower portion 112 can include a post 120, which can together connect a rear portion of the upper portion 110 and the lower portion 112 and can form a hinge for rotation of the upper portion 110 with respect to the lower portion 112.

The lower portion 112 can also include a lip 122 at least partially forming the opening 114. The lip 122 can be a full perimeter lip around the opening 114 that is configured to return or deflect water from the aerator 106 that flows through the housing 102 back into the housing 102 to help reduce a velocity of water exiting the opening 114. The lip 122 can deflect water both when the razor is inserted into the housing 102 and when the razor is not within the housing 102.

FIG. 3 also shows how the collar 108 can receive the aerator housing 104 at least partially therein to position the aerator 106 hear the head 52. The razor cleaning system 100 can also include an aerator gasket 124 located within the collar 108 and configured to be engaged with the upper portion 110 and the aerator housing 104 to help form a seal between the aerator housing 104 and the upper portion 110. The aerator gasket 124 can be compressed between the aerator housing 104 and the upper portion 110 when the aerator housing 104 is secured to the collar 108.

The upper portion 110 can also include a jet or port 126 extending through an upper wall 127 of the upper portion 110. The port 126 can be a jet or nozzle configured to deliver relative high velocity water from the aerator 106 toward the head 52. The port 126 can be located within (and at least partially surrounded by) the collar 108 and can be located such that the aerator 106 is positioned near the port 126 when the aerator housing 104 is secured to the collar 108 to allow water to be delivered through the aerator 106 and into the port 126 such that water can be sprayed at a relatively high velocity toward the head 52.

Figure 16:
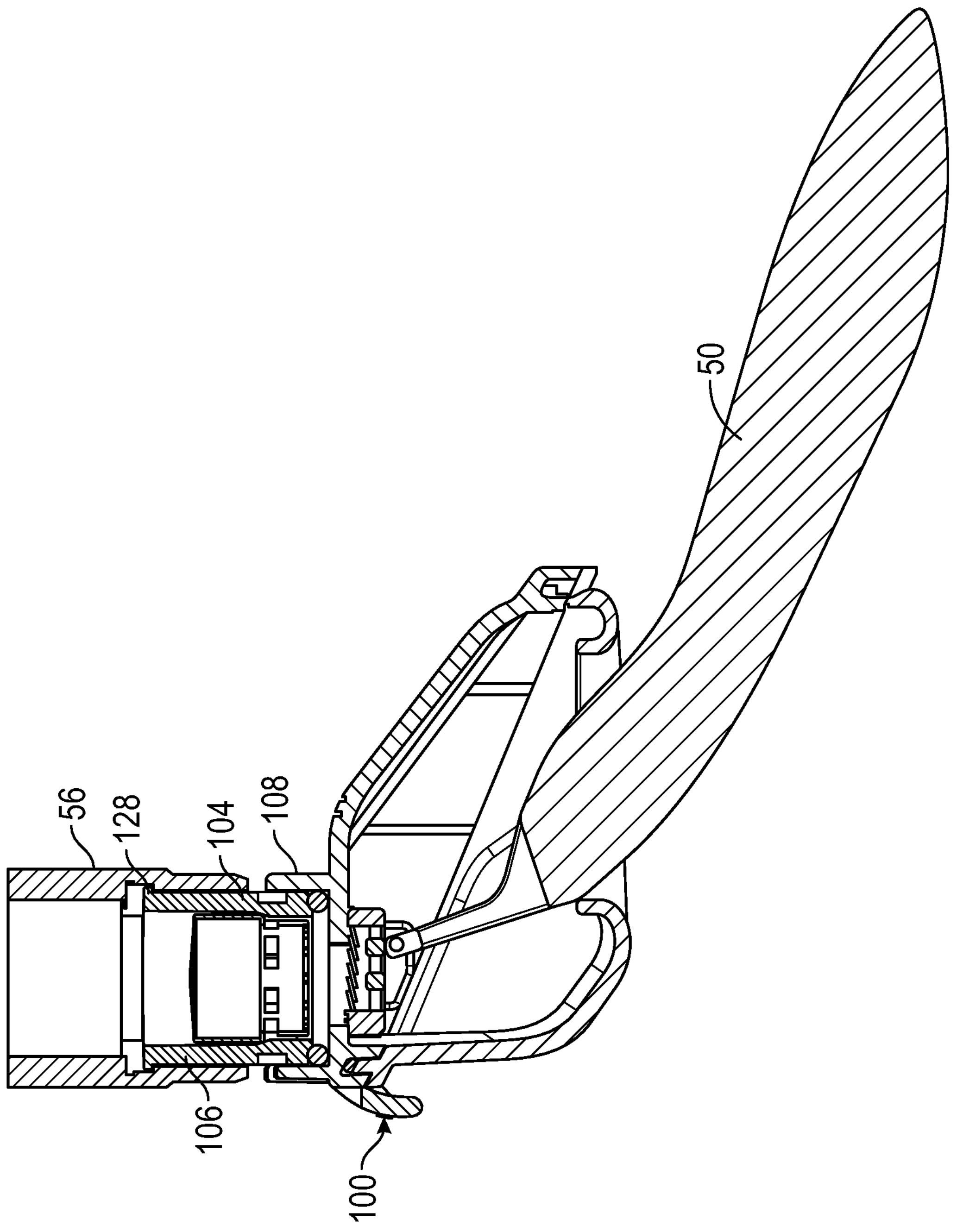
FIG. 16 illustrates a cross-sectional view of a portion of a razor cleaning system and a portion of a faucet.

FIG. 3 also shows that the aerator housing 104 can include a lip or flange 128 for securing the aerator housing 104 to a faucet, as shown in FIG. 16.

Figure 4:
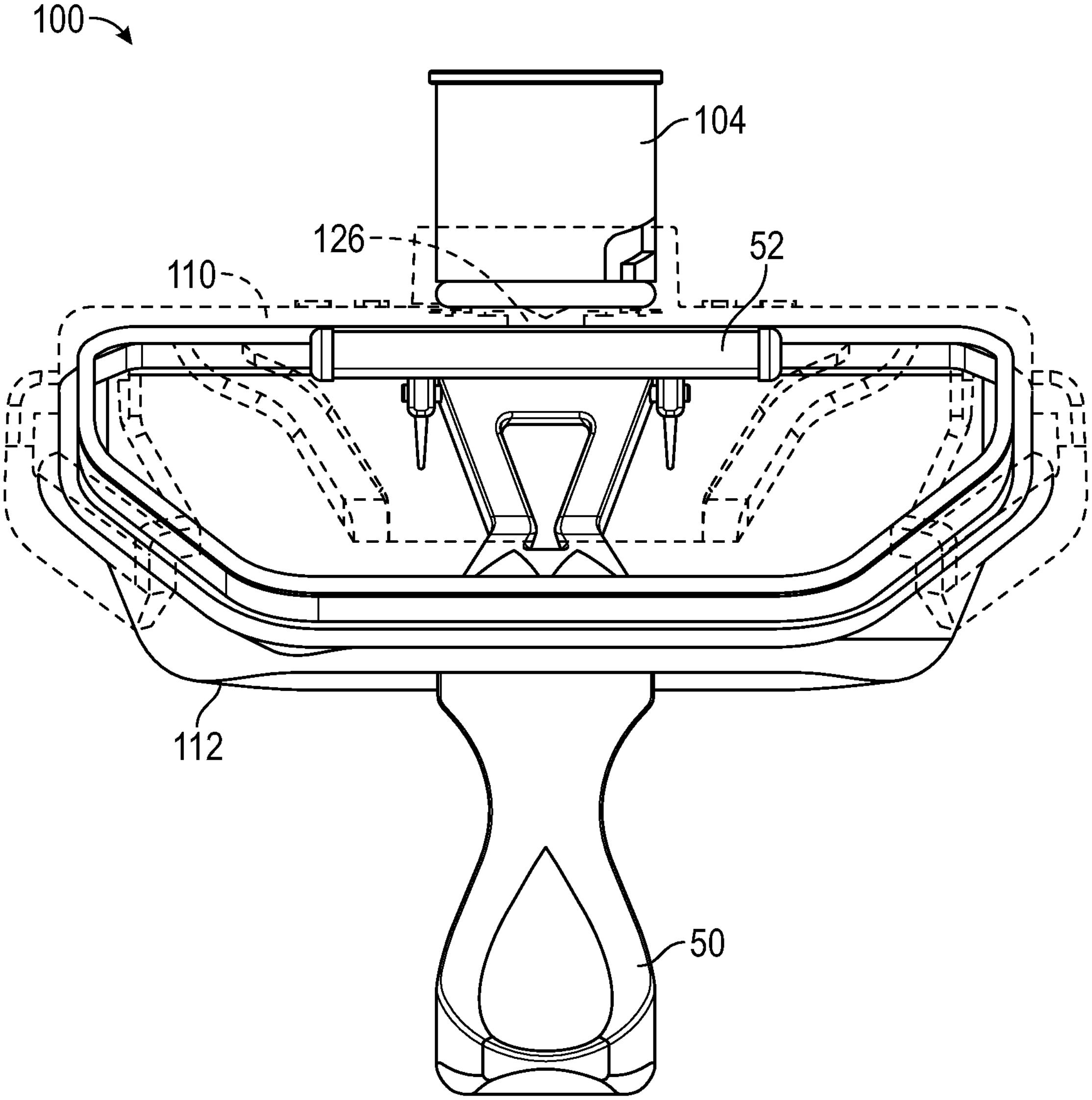
FIG. 4 illustrates a front view of a razor cleaning system.

FIG. 4 illustrates a front view of the razor cleaning system 100. The razor cleaning system 100 of FIG. 4 can be consistent with the razor cleaning system 100 of FIGS. 1-3; FIG. 4 shows further details of the razor cleaning system 100. For example, FIG. 4 shows that the head 52 of the razor 50 can be located near the port 126 to directly receive the water from the port 126. FIG. 4 also shows that the upper portion 110 is sized to allow the head 52 to be moved within the razor cleaning system 100 laterally to allow a user to move the entire (or most of the) head 52 past the port 126 for complete or thorough cleaning of the head 52 using water from the port 126.

Figure 5:
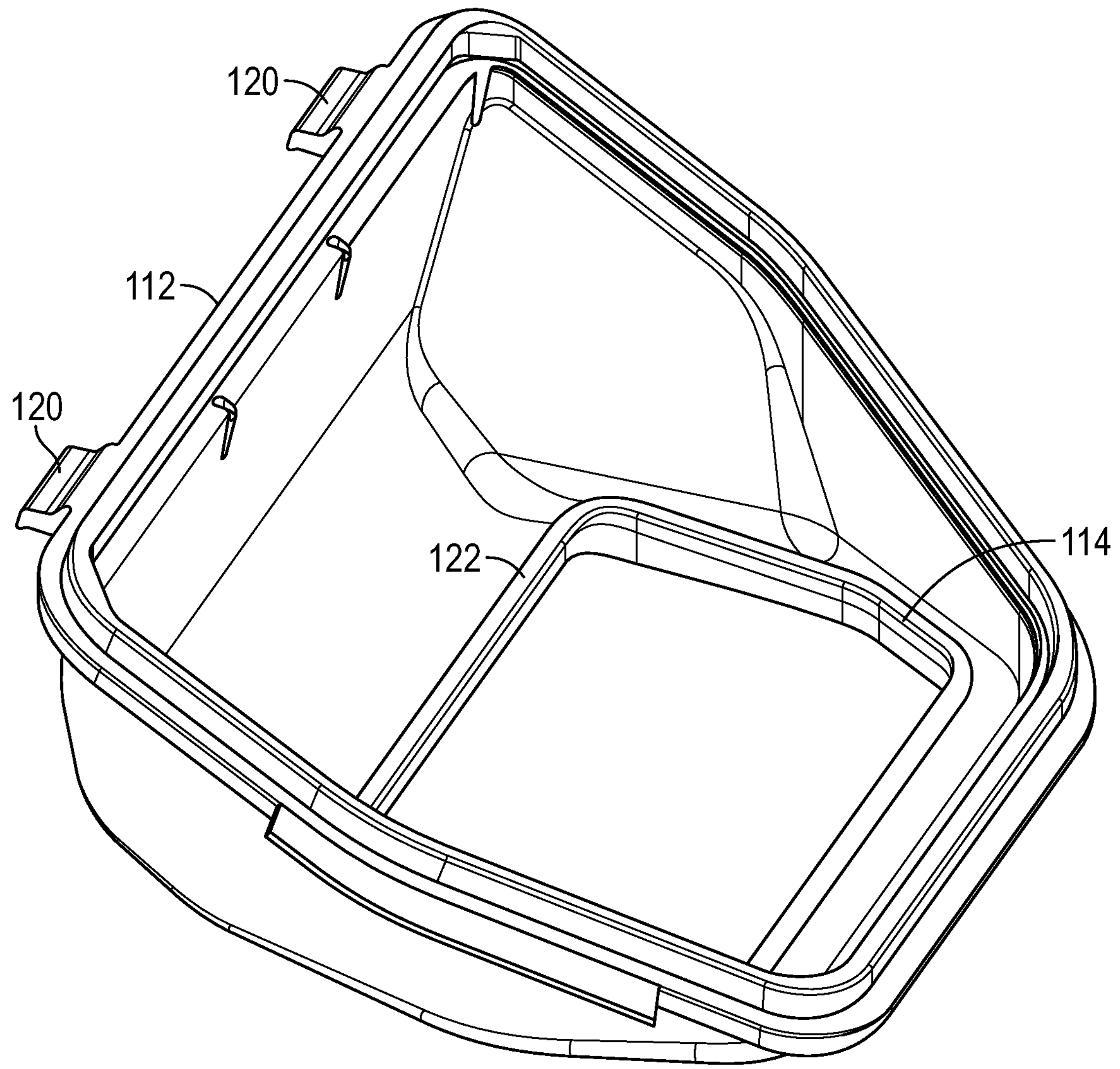
FIG. 5 illustrates a top isometric view of a portion of a razor cleaning system.

FIG. 5 illustrates a top isometric view of a portion of the razor cleaning system 100. The razor cleaning system 100 of FIG. 4 can be consistent with the razor cleaning system 100 of FIGS. 1-4; FIG. 5 shows further details of the razor cleaning system 100.

Figure 6:
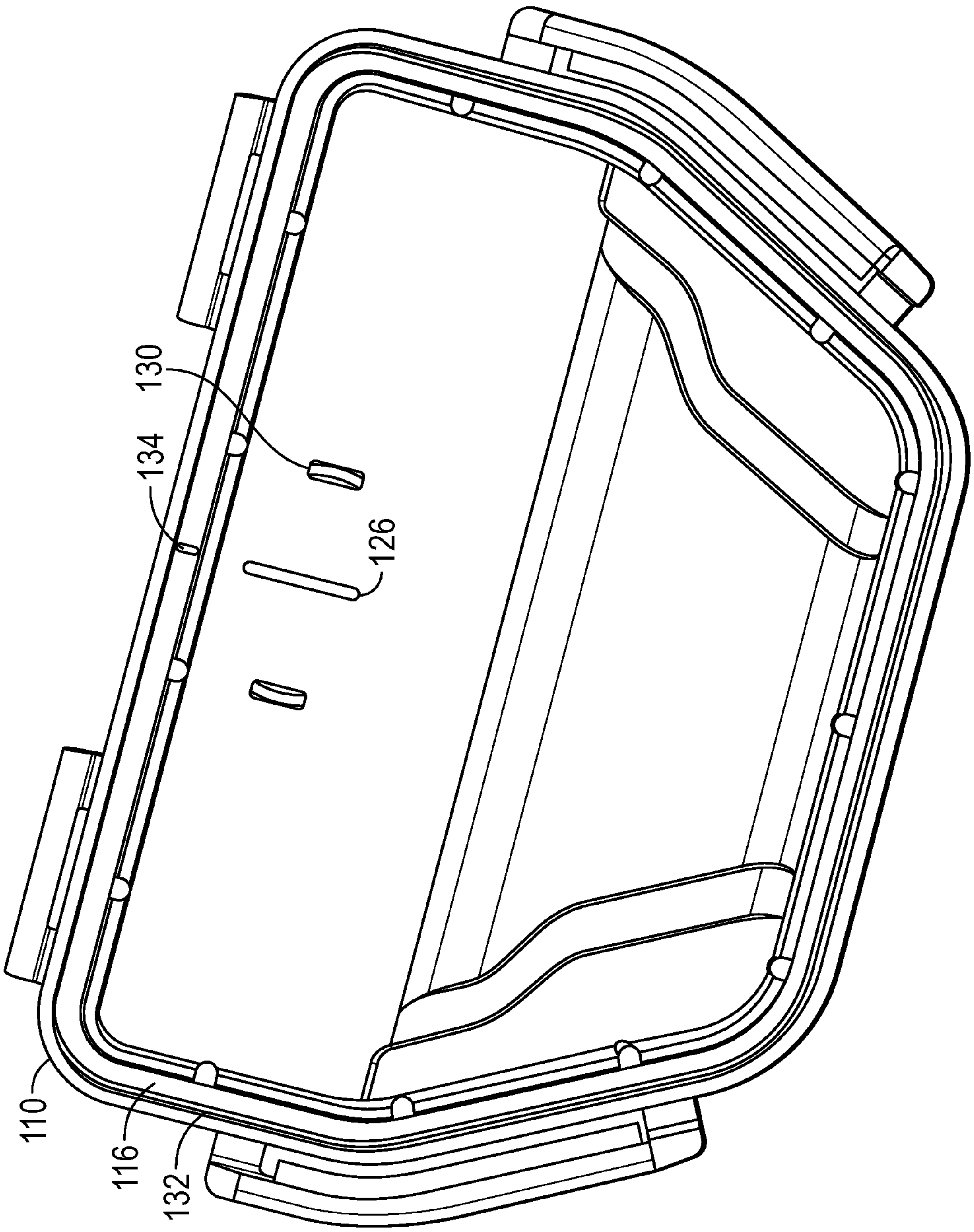
FIG. 6 illustrates a bottom isometric view of a portion of a razor cleaning system.

FIG. 6 illustrates a bottom isometric view of a portion of the razor cleaning system 100. The razor cleaning system 100 of FIG. 6 can be consistent with the razor cleaning system 100 of FIGS. 1-3; FIG. 6 shows further details of the razor cleaning system 100. For example, FIG. 6 shows that the upper portion 110 can include one or more bores 130 therein or therethrough. The one or more bores 130 can provide pressure relief for fluid or water traveling through the aerator 106 at pressures higher than the gasket 116 can hold, which can help to limit water from traveling back out through the collar 108, instead directing the overflow to within the upper portion 110 while also providing additional water streams for cleaning of the head 52.

FIG. 6 also shows that the gasket 116 can be at least partially inserted into a channel 132 of the upper portion 110 and shows that the gasket 116 can include a gap 134, which can help to reduce cost of the gasket 116.

Figure 7:
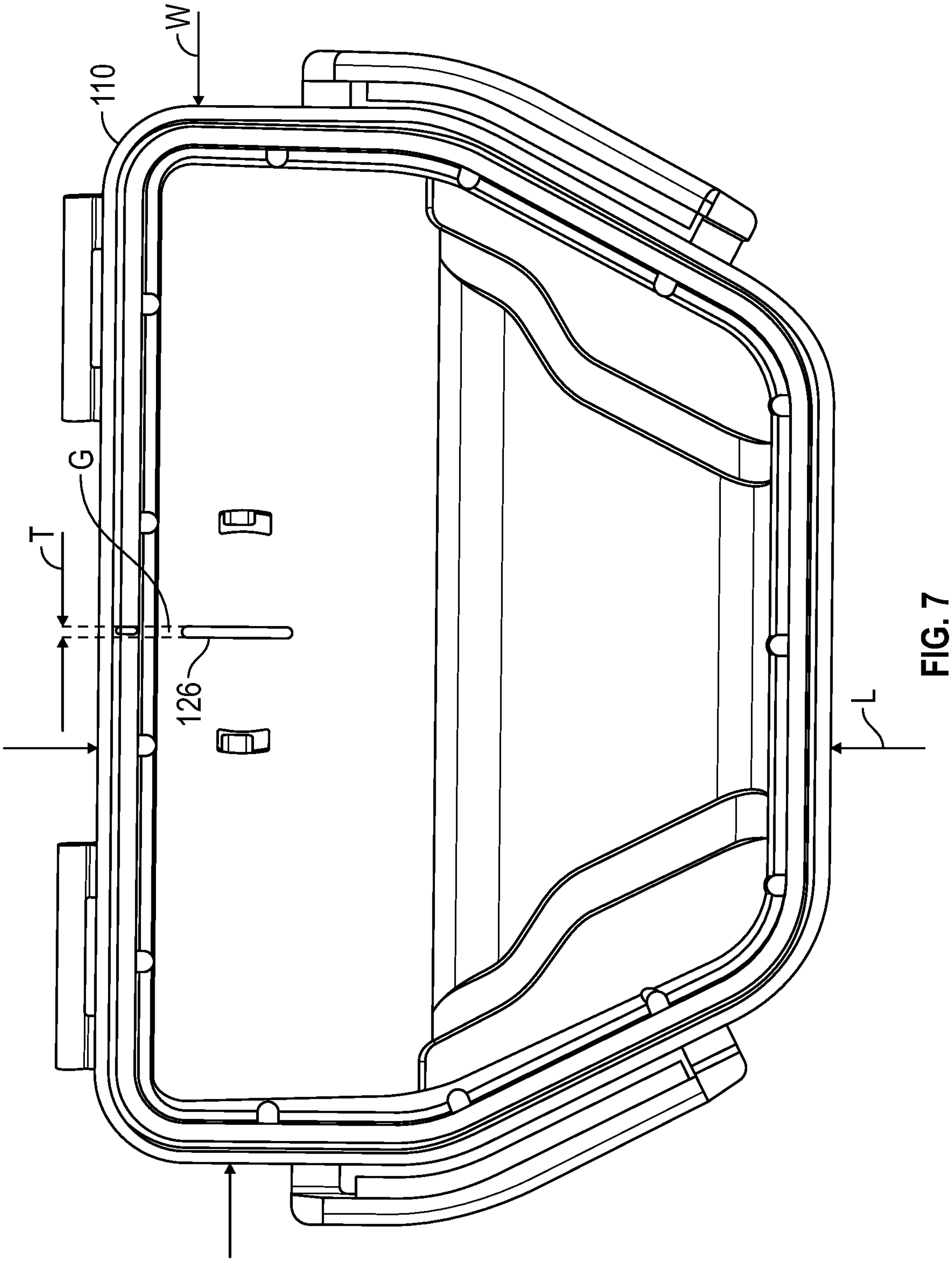
FIG. 7 illustrates a top isometric view of a portion of a razor cleaning system.

FIG. 7 illustrates a top isometric view of a portion of the razor cleaning system 100. The razor cleaning system 100 of FIG. 7 can be consistent with the razor cleaning system 100 of FIGS. 1-6; FIG. 7 shows further details of the razor cleaning system 100. For example, FIG. 7 shows a width W of the upper portion 110, which can be sized to accommodate a width of a head of a variety of razor shapes and sizes while also accommodating lateral movement of the head 52 past the port 126 for effective cleaning.

FIG. 7 also shows a length L of the upper portion 110, which can be sized to accept a variety of razor lengths while limiting water splash out of the upper portion 110 during cleaning operations. FIG. 7 also shows a gap G between the port 126 and a perimeter of the upper portion 110 to accommodate a frame of a head of the razor such that the port 126 discharges water at the blades of the head 52. FIG. 7 further shows a thickness T or width of the port 126, which can be sized to provide a high velocity of water toward the head 52 for relatively fast and effective cleaning of debris from the head 52 without damaging the head 52. The thickness T can be, for example between 0.1 millimeter (mm) and 2 mm. In some examples, the thickness T can be 0.5 mm or 0.75 mm. In some examples, the thickness T can be between 0.4 mm and 1.0 mm. A length of the port 126 can be sized to cover a length of the head 52.

Figure 8:
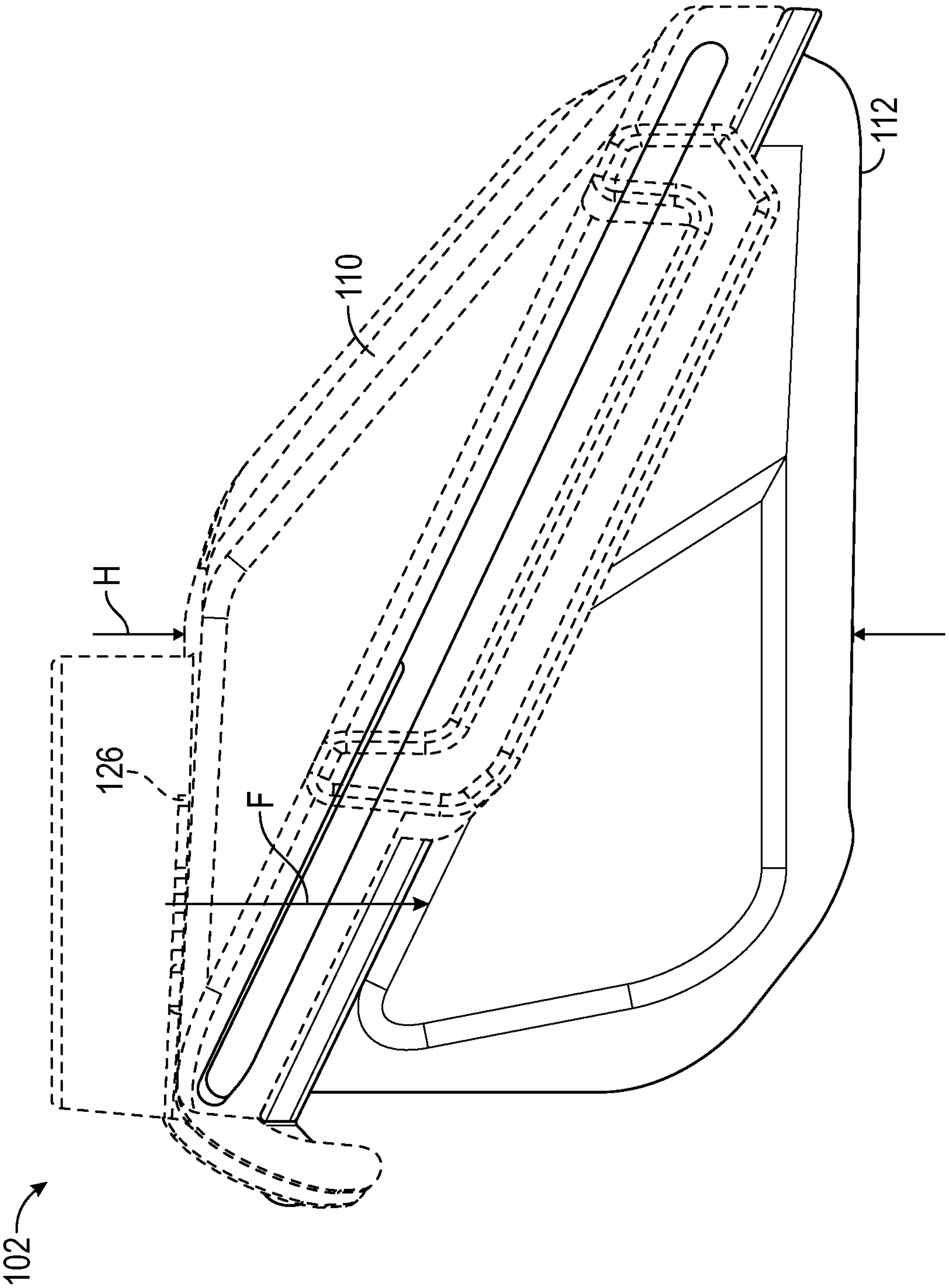
FIG. 8 illustrates a side isometric view of a portion of a razor cleaning system.

FIG. 8 illustrates a side isometric view of a portion of the razor cleaning system 100. The razor cleaning system 100 of FIG. 8 can be consistent with the razor cleaning system 100 of FIGS. 1-7; FIG. 8 shows further details of the razor cleaning system 100. For example, FIG. 8 shows that the housing 102, when assembled, can have a height H, which can be sized to direct fluid F (or water) from the port 126 to reflect off a bottom surface and move around the housing 102, reducing velocity of the fluid or water before it discharges from the housing 102.

Figure 9:
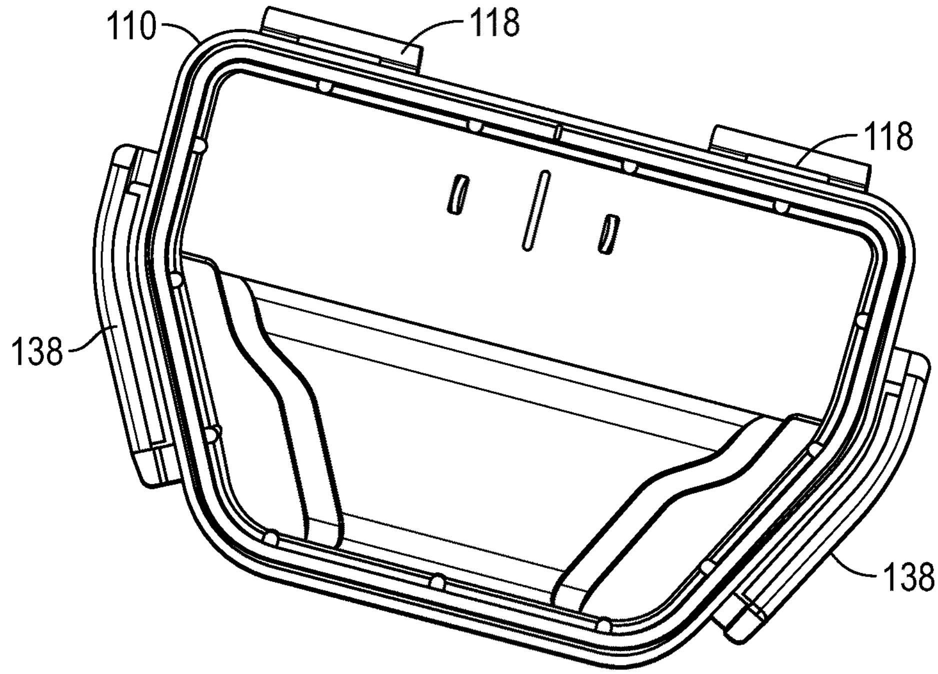
FIG. 9 illustrates a bottom isometric view of a portion of a razor cleaning system.
Figure 10:
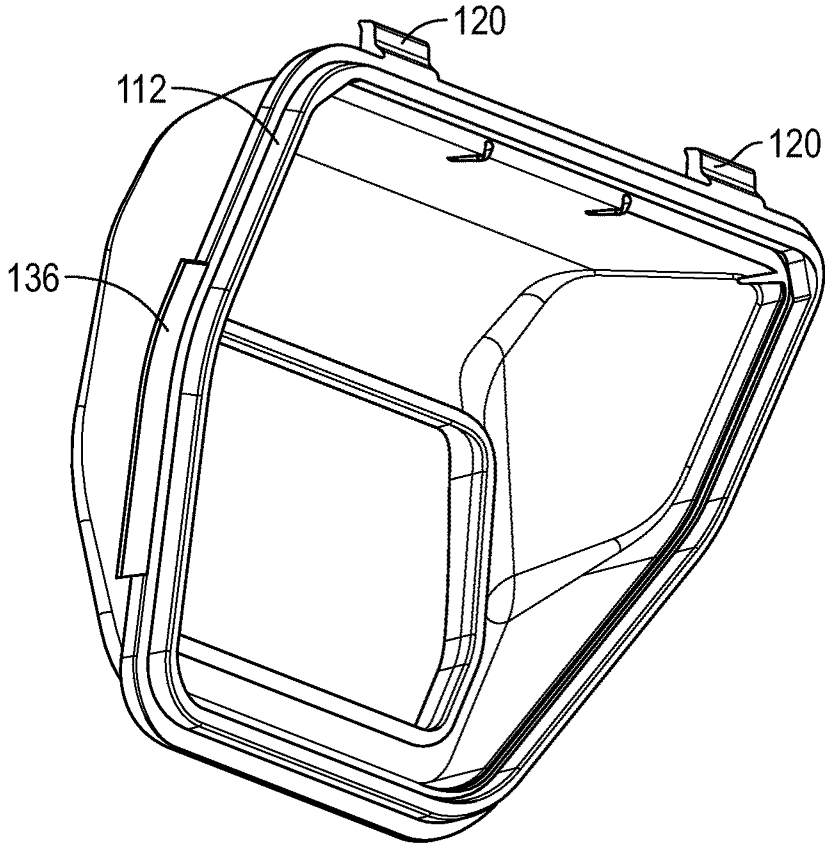
FIG. 10 illustrates a top isometric view of a portion of a razor cleaning system.

FIG. 9 illustrates a bottom isometric view of a portion of the razor cleaning system 100. FIG. 10 illustrates a top isometric view of a portion of the razor cleaning system 100. FIGS. 9 and 10 are discussed together below. The razor cleaning system 100 of FIGS. 9-10 can be consistent with the razor cleaning system 100 of FIGS. 1-8; FIGS. 9-10 show further details of the razor cleaning system 100.

For example, FIGS. 9-10 more clearly shows hooks 118 of the upper portion 110 and the posts 120 of the lower portion 112, which, when connected can form a hinge between the upper portion 110 and the lower portion 112.

FIGS. 9-10 also show that the lower portion 112 can include lateral projections 136 and the upper portion 110 can include retainers 138 configured to receive the lateral projections 136 at least partially therein, respectively, to form a snap fit engagement between the lateral projections 136 and the retainers 138 to releasably secure the upper portion 110 to the lower portion 112.

Figure 11:
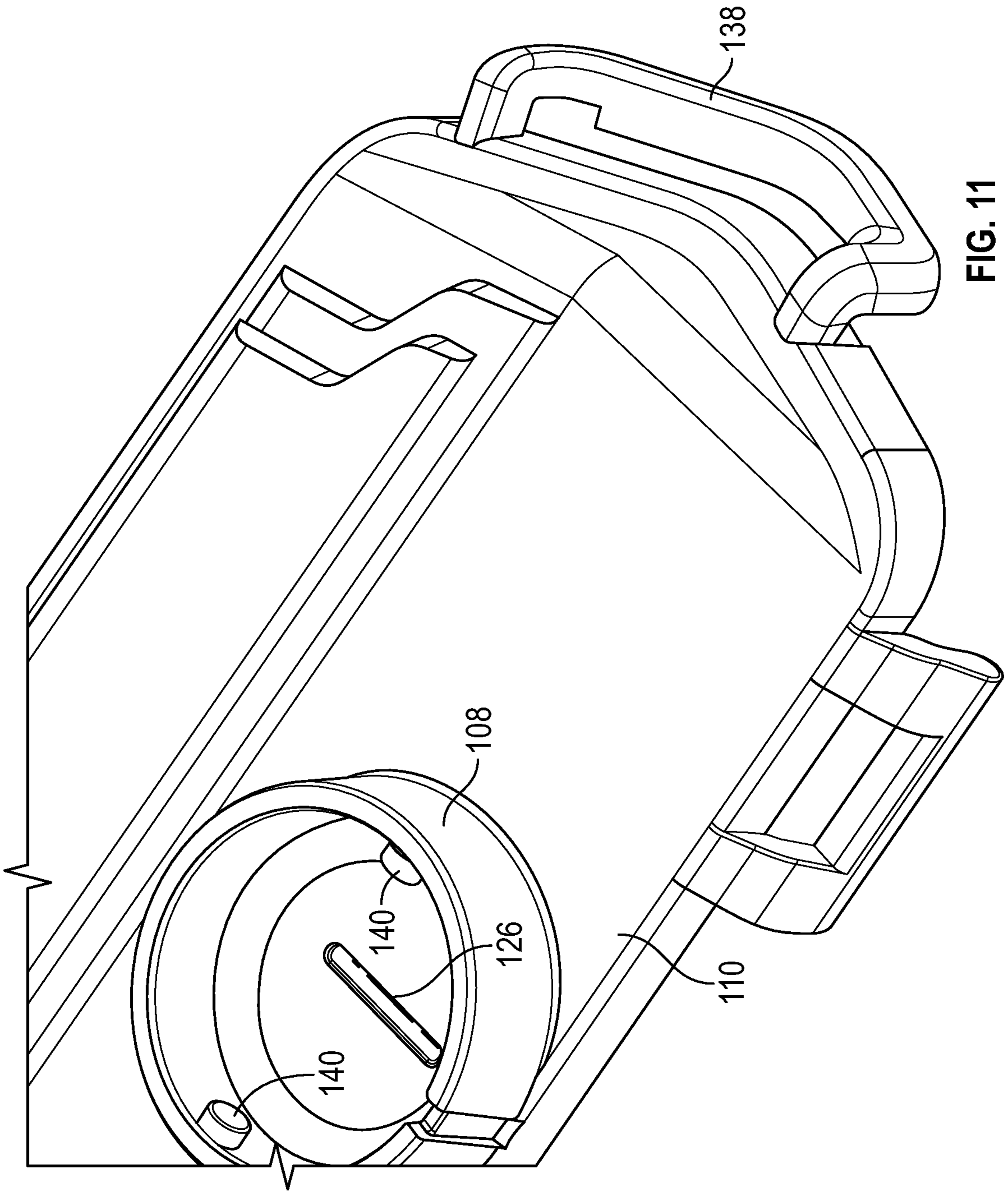
FIG. 11 illustrates an enlarged top isometric view of a portion of a razor cleaning system.

FIG. 11 illustrates an enlarged top isometric view of a portion of the razor cleaning system 100. The razor cleaning system 100 of FIG. 11 can be consistent with the razor cleaning system 100 of FIGS. 1-10; FIG. 11 shows further details of the razor cleaning system 100.

For example, FIG. 11 more clearly shows the retainers 138, which can be configured to flex to receive one of the lateral projections 136 at least partially therein. FIG. 11 also shows the location of the port 126 within the collar 108. FIG. 11 further shows that the collar 108 can include bosses 140 extending radially inward therefrom. The bosses 140 can be configured to secure the aerator housing 104 to the collar 108, as discussed further below.

Figure 12:
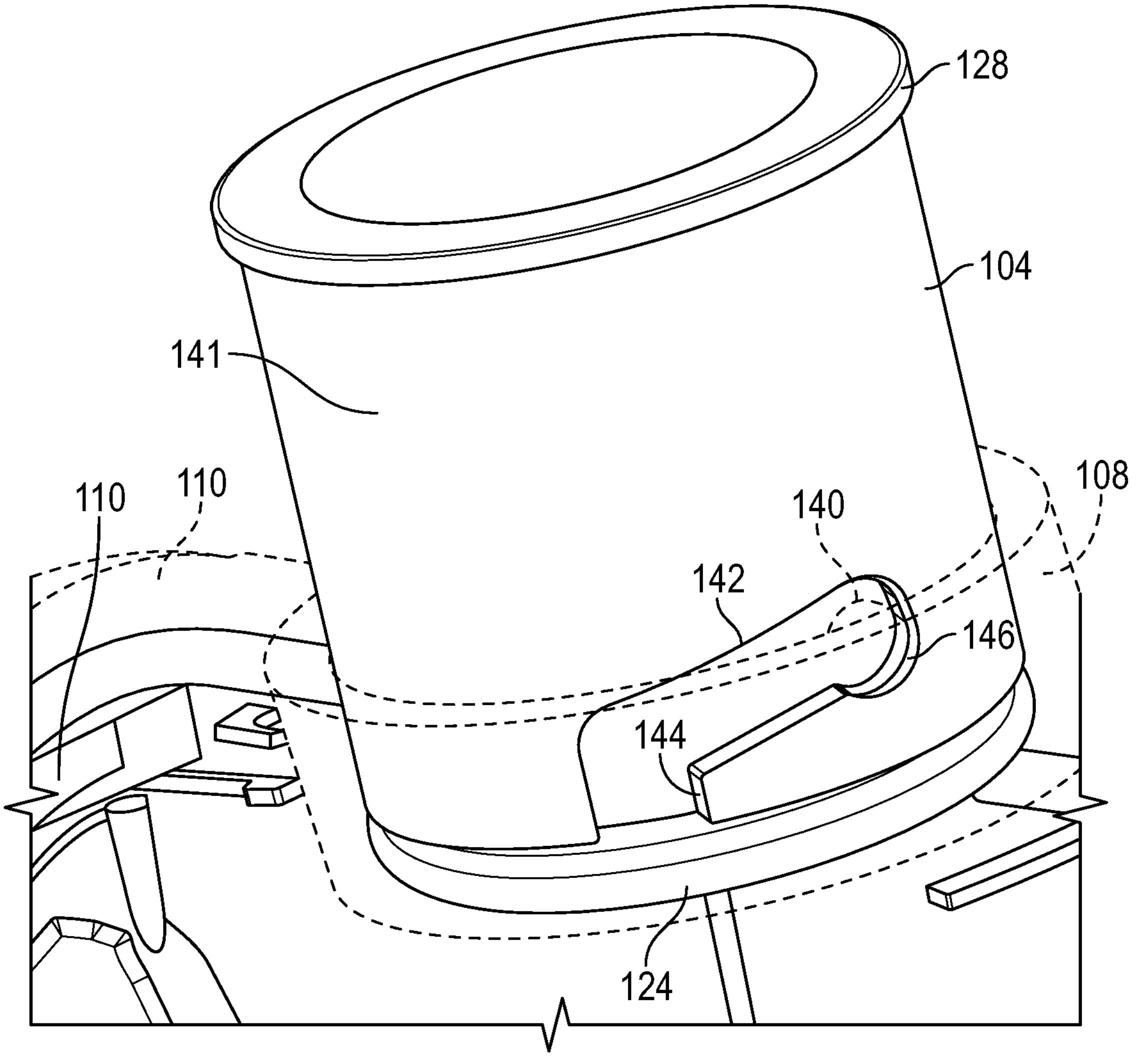
FIG. 12 illustrates an enlarged isometric view of a portion of a razor cleaning system.

FIG. 12 illustrates an enlarged isometric view of a portion of the razor cleaning system 100. In FIG. 12, the upper portion 110 is shown in phantom. The razor cleaning system 100 of FIG. 12 can be consistent with the razor cleaning system 100 of FIGS. 1-11; FIG. 12 shows further details of the razor cleaning system 100.

For example, FIG. 12 shows that an outer surface 141 of the aerator housing 104 can include or can define a cam track 142 configured to receive the bosses 140 therein to secure the aerator housing 104 to the collar 108. The angle of the cam track 142 can be configured to force the aerator housing 104 to compress the aerator gasket 124 between the aerator housing 104 and the upper portion 110.

The cam track 142 can include an opening 144 to receive the boss 140 into the track 142. The cam track 142 can also include a notch 146, where movement of the bosses 140 into the notch 146 can lock the bosses 140 to the aerator housing 104 and can also provide tactile feedback for a user to know when the upper portion 110 is secured to the aerator housing 104.

Figure 13:
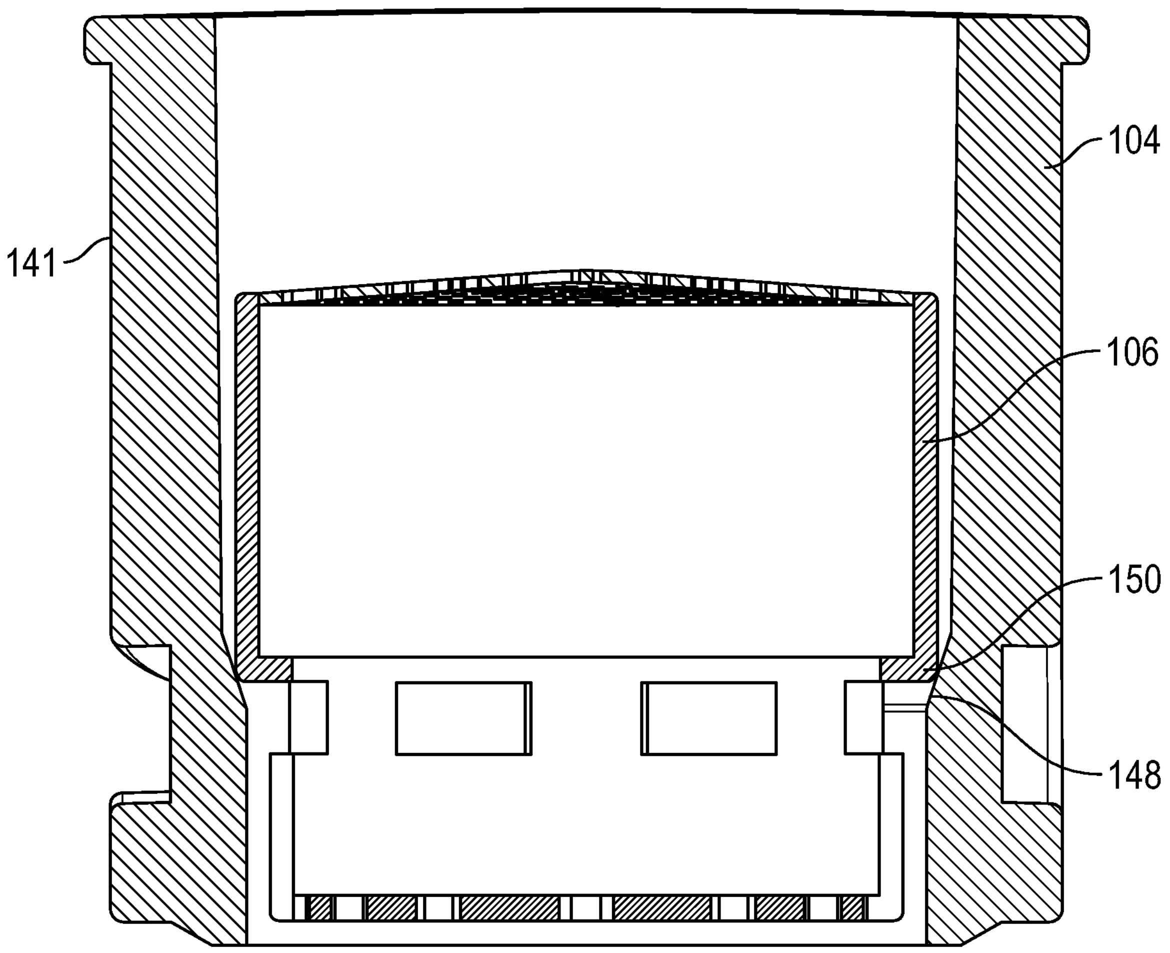
FIG. 13 illustrates a cross-sectional view of a portion of a razor cleaning system.

FIG. 13 illustrates a cross-sectional view of a portion of a razor cleaning system. The razor cleaning system 100 of FIG. 13 can be consistent with the razor cleaning system 100 of FIGS. 1-12; FIG. 13 shows further details of the razor cleaning system 100.

For example, FIG. 13 shows that the aerator housing 104 can include a chamfer angle 148, which can help to provide tolerance for different sizes of aerators. During operation, downward water pressure on the aerator 106 can force an aerator lip 150 on to chamfer angle 148 to help orient the aerator 106 within the aerator housing 104 and to form a seal and to help secure the aerator 106 to the aerator housing 104.

Figure 14:
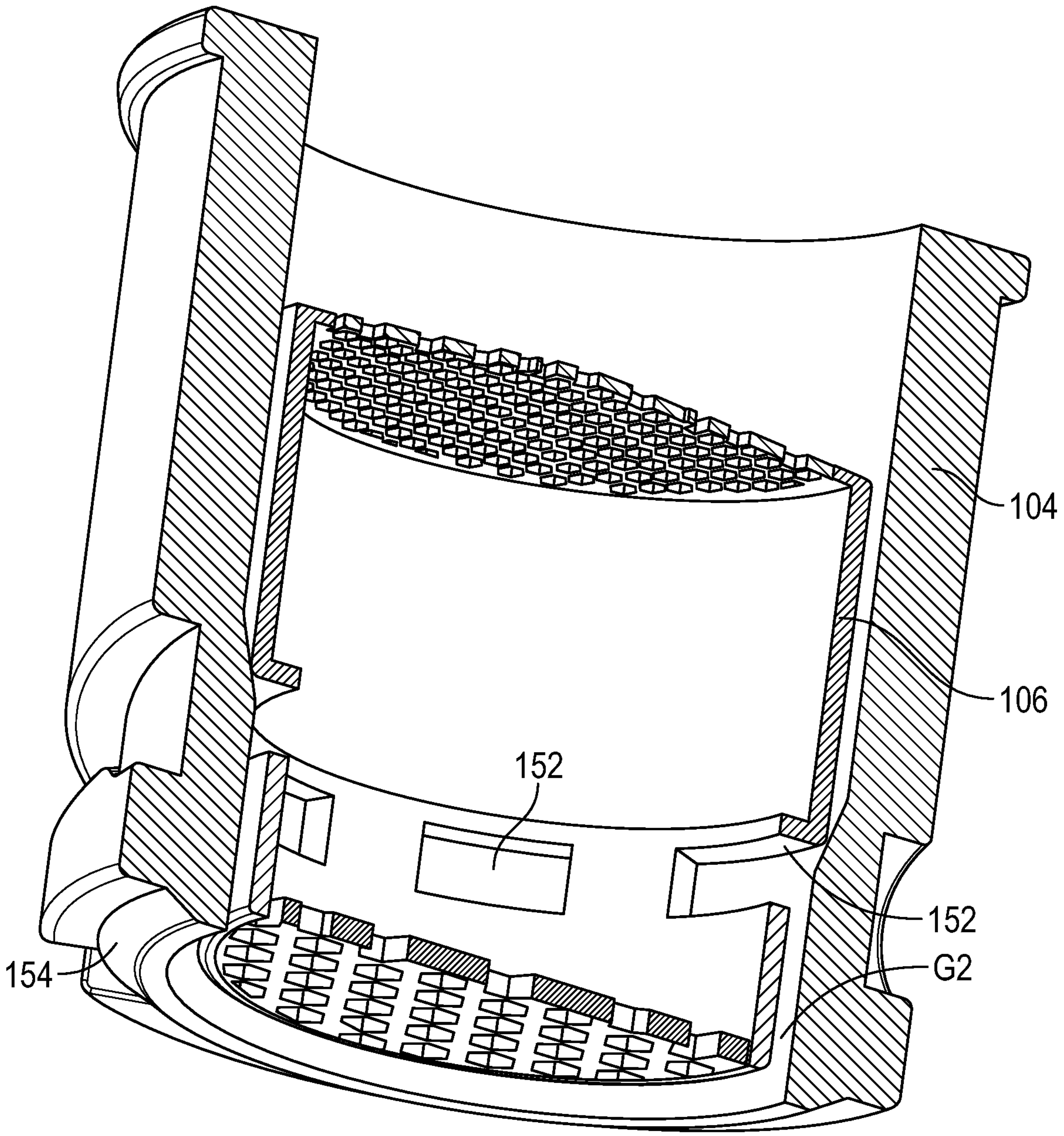
FIG. 14 illustrates a cross-sectional view of a portion of a razor cleaning system.

FIG. 14 illustrates a cross-sectional view of a portion of a razor cleaning system. The razor cleaning system 100 of FIG. 14 can be consistent with the razor cleaning system 100 of FIGS. 1-13; FIG. 14 shows further details of the razor cleaning system 100.

For example, FIG. 14 shows that the aerator housing 104 can include a gap G2 between the aerator 106 and the aerator housing 104, which can allow for intake air to travel between the aerator 106 and the aerator housing 104 to aerator ports 152. The aerator housing 104 can also include a chamfer 154, which can be angled or otherwise configured (e.g., sized or shaped) to aid in compressing a aerator gasket 124 between the aerator housing 104 and the upper portion 110 and collar 108.

Figure 15:
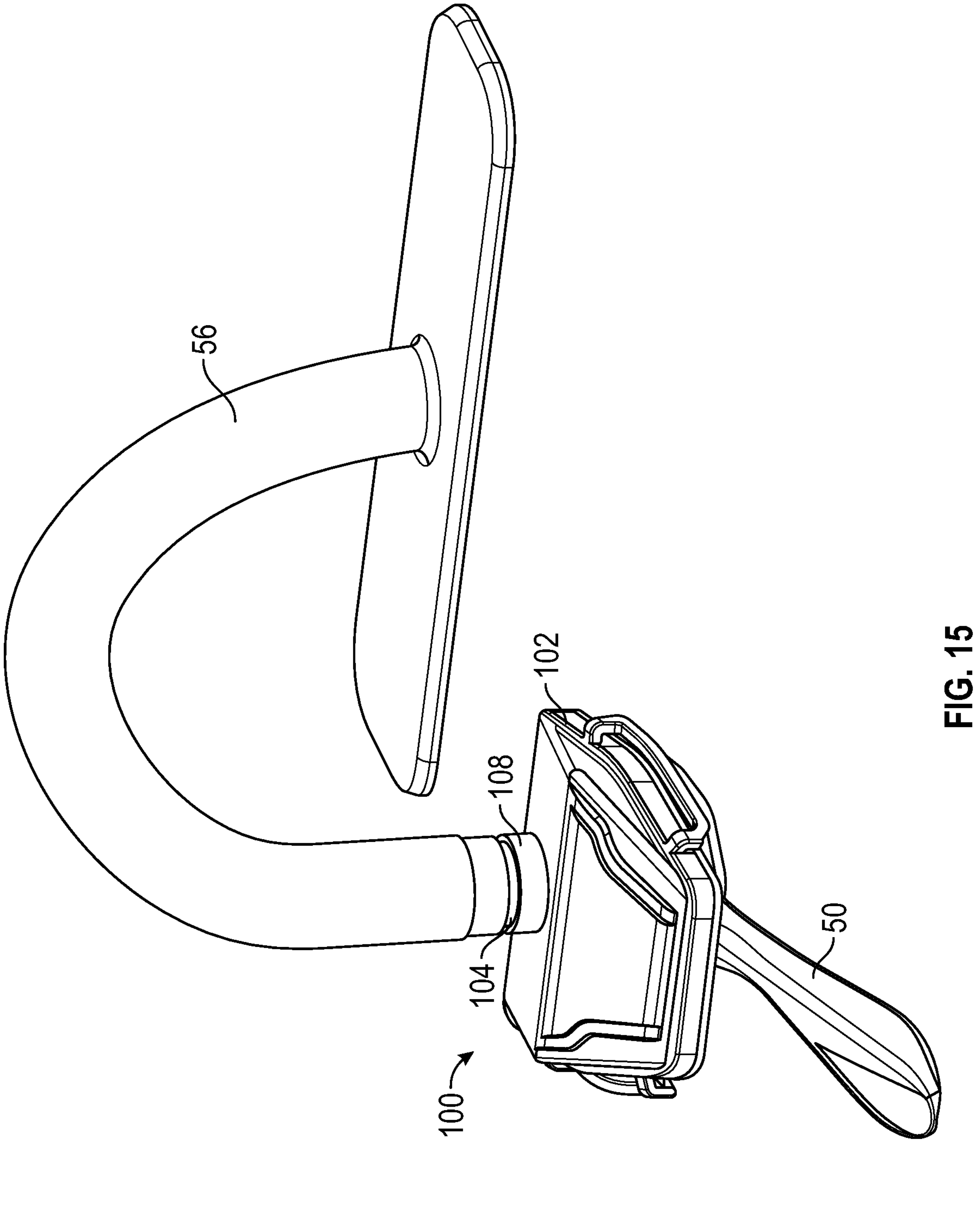
FIG. 15 illustrates an isometric view of a portion of a razor cleaning system and a faucet.

FIG. 15 illustrates an isometric view of a portion of the razor cleaning system 100 and a faucet 56. FIG. 16 illustrates a cross-sectional view of a portion of the razor cleaning system 100 and a portion of the faucet 56. The razor cleaning system 100 of FIGS. 15-16 can be consistent with the razor cleaning system 100 of FIGS. 1-14; FIGS. 15-16 show how the razor cleaning system 100 can be secured to a faucet 56.

For example, as shown in FIG. 16, the aerator housing 104 can be secured within the faucet, such as using the flange 128, or by using a retaining device (e.g., threaded collar) of the faucet 56. The aerator housing 104 and the aerator 106 can remain connected to the faucet 56 when the razor cleaning system 100 is not in use. Then, the housing 102 can be secured to the aerator housing 104 (as discussed above, e.g., using the bosses 140 or projections) by a user when it is desired to use the razor cleaning system 100 to clean a razor (e.g., the faucet 56).

NOTES AND EXAMPLES

The following, non-limiting examples, detail certain aspects of the present subject matter to solve the challenges and provide the benefits discussed herein, among others.

Example 1 is a shaving razor cleaning system, comprising: an aerator housing securable to a faucet, the aerator housing including a pair of slots; and a razor housing configured to receive a razor therein, the razor housing including: a bottom portion defining an opening to receive a head of the razor into the razor housing; a top portion defining a jet configured to discharge water from the faucet toward the head of the razor when the razor is inserted into the razor housing and when the faucet is turned on; and a pair of bosses releasably insertable into the pair of slots of the aerator housing, respectively, to releasably secure the razor housing to the aerator housing and the faucet.

In Example 2, the subject matter of Example 1 optionally includes a housing gasket engageable with the top portion and the bottom portion to form a seal therebetween.

In Example 3, the subject matter of any one or more of Examples 1-2 optionally include a collar connected to the top portion and defining a collar bore configured to receive at least a portion of the aerator housing at least partially therein.

In Example 4, the subject matter of Example 3 optionally includes wherein the pair of bosses are connected to the collar.

In Example 5, the subject matter of any one or more of Examples 3-4 optionally include an aerator gasket located at least partially within the collar and engageable with the top portion and the aerator housing when the top portion is secured to the aerator housing.

In Example 6, the subject matter of Example 5 optionally includes wherein the jet is surrounded by the collar and the aerator gasket when the aerator housing is connected to the collar.

In Example 7, the subject matter of Example 6 optionally includes wherein the jet is defined by a single opening having a width between 0.4 millimeters and 1 millimeter.

In Example 8, the subject matter of any one or more of Examples 1-7 optionally include wherein the bottom portion includes a lip extending around a perimeter of the opening.

In Example 9, the subject matter of any one or more of Examples 1-8 optionally include wherein the bottom portion includes a pair of tabs insertable into a pair of slots of the top portion to secure the bottom portion to the top portion.

In Example 10, the subject matter of any one or more of Examples 1-9 optionally include wherein the pair of slots are formed into an outer surface of the aerator housing and are angled.

In Example 11, the subject matter of any one or more of Examples 1-10 optionally include an aerator insertable into the aerator housing.

In Example 12, the subject matter of Example 11 optionally includes wherein an internal surface of the aerator housing includes a chamfer engageable with the aerator to orient the aerator within the aerator housing.

Example 13 is a shaving razor cleaning assembly, comprising: an aerator housing securable to a faucet; and a razor housing configured to receive a shaving razor therein, the razor housing including: a bottom portion defining an opening to receive a head of the shaving razor into the razor housing; a top portion connected to the bottom portion, the top portion including an upper wall defining a jet configured to discharge water from the faucet toward the head of the shaving razor when the shaving razor is inserted into the razor housing; and one or more projections engageable with the aerator housing to releasably secure the razor housing to the aerator housing and the faucet.

In Example 14, the subject matter of Example 13 optionally includes a collar connected to the top portion and defining a collar bore configured to receive at least a portion of the aerator housing at least partially therein.

In Example 15, the subject matter of Example 14 optionally includes wherein the one or more projections extend radially inward from the collar.

In Example 16, the subject matter of Example 15 optionally includes an aerator gasket located at least partially within the collar and engageable with the upper wall, the collar, and the aerator housing when the top portion is secured to the aerator housing.

In Example 17, the subject matter of any one or more of Examples 14-16 optionally include wherein the jet is surrounded by the collar when the aerator housing is connected to the collar.

In Example 18, the subject matter of Example 17 optionally includes wherein the bottom portion includes a lip extending around a perimeter of the opening, the lip configured to deflect water from the jet away from the opening.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A shaving razor cleaning system, comprising:
- an aerator housing securable to a faucet, the aerator housing including a pair of slots; and
- a razor housing configured to receive a razor therein, the razor housing including:
  - a bottom portion defining an opening to receive a head of the razor into the razor housing;
  - a top portion defining a jet configured to discharge water from the faucet toward the head of the razor when the razor is inserted into the razor housing and when the faucet is turned on;
  - a pair of bosses releasably insertable into the pair of slots of the aerator housing, respectively, to releasably secure the razor housing to the aerator housing and the faucet; and
  - a housing gasket engageable with the top portion and the bottom portion to form a seal therebetween.

2. The shaving razor cleaning system of claim 1, further comprising:
- a collar connected to the top portion and defining a collar bore configured to receive at least a portion of the aerator housing at least partially therein.

3. The shaving razor cleaning system of claim 2, wherein the pair of bosses are connected to the collar.

4. The shaving razor cleaning system of claim 2, further comprising:
- an aerator gasket located at least partially within the collar and engageable with the top portion and the aerator housing when the top portion is secured to the aerator housing.

5. The shaving razor cleaning system of claim 4, wherein the jet is surrounded by the collar and the aerator gasket when the aerator housing is connected to the collar.

6. The shaving razor cleaning system of claim 5, wherein the jet is defined by a single opening having a width between 0.4 millimeters and 1 millimeter.

7. The shaving razor cleaning system of claim 1, wherein the bottom portion includes a lip extending around a perimeter of the opening.

8. The shaving razor cleaning system of claim 1, wherein the bottom portion includes a pair of tabs insertable into a pair of slots of the top portion to secure the bottom portion to the top portion.

9. The shaving razor cleaning system of claim 8, wherein the pair of slots are formed into an outer surface of the aerator housing and are angled.

10. The shaving razor cleaning system of claim 1, further comprising:
- an aerator insertable into the aerator housing.

11. The shaving razor cleaning system of claim 10, wherein an internal surface of the aerator housing includes a chamfer engageable with the aerator to orient the aerator within the aerator housing.

12. A shaving razor cleaning system, comprising:

an aerator housing securable to a faucet, the aerator housing including a pair of slots; and a razor housing configured to receive a razor therein, the razor housing including:

a bottom portion defining an opening to receive a head of the razor into the razor housing, the bottom portion including a pair of tabs;

a top portion defining a jet configured to discharge water from the faucet toward the head of the razor when the razor is inserted into the razor housing and when the faucet is turned on, the top portion including a pair of slots, the pair of tabs insertable into the pair of slots to secure the bottom portion to the top portion; and a pair of bosses releasably insertable into the pair of slots of the aerator housing, respectively, to releasably secure the razor housing to the aerator housing and the faucet.

13. The shaving razor cleaning system of claim 12, wherein the pair of slots are formed into an outer surface of the aerator housing and are angled.

14. The shaving razor cleaning system of claim 12, comprising:

an aerator insertable into the aerator housing.

15. The shaving razor cleaning system of claim 14, wherein an internal surface of the aerator housing includes a chamfer engageable with the aerator to orient the aerator within the aerator housing.

16. The shaving razor cleaning system of claim 14, comprising:

one or more projections engageable with the aerator housing to releasably secure the razor housing to the aerator housing and the faucet.

17. The shaving razor cleaning system of claim 16, comprising:

a collar connected to the top portion and defining a collar bore configured to receive at least a portion of the aerator housing at least partially therein.

18. The shaving razor cleaning system of claim 17, wherein the one or more projections extend radially inward from the collar.

19. The shaving razor cleaning system of claim 17, wherein the jet is surrounded by the collar when the aerator housing is connected to the collar.

20. The shaving razor cleaning system of claim 19, wherein the bottom portion includes a lip extending around a perimeter of the opening, the lip configured to deflect water from the jet away from the opening.

* * * * *